(12) United States Patent
Assuncao et al.

(10) Patent No.: US 9,898,479 B2
(45) Date of Patent: *Feb. 20, 2018

(54) DATA DISTRIBUTION SYSTEM, METHOD AND PROGRAM PRODUCT

(71) Applicant: International Business Machines Corporation, Armonk, NY (US)

(72) Inventors: Marcos Dias De Assuncao, Sao Paulo (BR); Silvia Cristina Sardela Bianchi, Sao Paulo (BR); Marco Aurelio Stelmar Netto, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 14/686,767

(22) Filed: Apr. 14, 2015

(65) Prior Publication Data
US 2015/0220557 A1    Aug. 6, 2015

Related U.S. Application Data

(63) Continuation of application No. 13/773,593, filed on Feb. 21, 2013, now Pat. No. 9,092,498.

(51) Int. Cl.
G06F 17/30 (2006.01)

(52) U.S. Cl.
CPC .. G06F 17/30174 (2013.01); G06F 17/30575 (2013.01)

(58) Field of Classification Search
None
See application file for complete search history.

(56) References Cited

U.S. PATENT DOCUMENTS

| | | |
|---|---|---|
| 6,862,594 B1 | 3/2005 | Saulpaugh et al. |
| 7,720,844 B2 | 5/2010 | Chu et al. |
| 7,827,559 B1 | 11/2010 | Rhee et al. |
| 7,877,468 B2 | 1/2011 | Abadir et al. |
| 2002/0098800 A1 | 7/2002 | Frazita et al. |

(Continued)

OTHER PUBLICATIONS

Muhl, "Generic constraints for content-based publish/subscribe," Proceedings of International Conference on Cooperative Information Systems, pp. 211-225, 2001.

(Continued)

*Primary Examiner* — Belix M Ortiz Ditren
(74) *Attorney, Agent, or Firm* — Law Office of Charles W. Peterson, Jr.; Louis J. Percello, Esq.

(57) ABSTRACT

A data distribution system, method and a computer program product therefor. Computers provisioned with operations centers supporting individual locations share resources with organizations in multiple locations. Each operations center receives and evaluates local information for the supported location and selectively provides evaluated information for reuse by other locations. A data exchange agent in each operations center publishes information available from a supported location to a publication subscription unit. The operations center also subscribes to the publication subscription unit for information available from other locations. The publication subscription unit identifies matches between subscriptions and publications. A negotiation unit negotiates matched information transfers between operations centers.

9 Claims, 9 Drawing Sheets

(56) References Cited

U.S. PATENT DOCUMENTS

| | | |
|---|---|---|
| 2007/0136743 A1 | 6/2007 | Hasek et al. |
| 2007/0178916 A1 | 8/2007 | Sorbara et al. |
| 2007/0280279 A1 | 12/2007 | Mituhasi et al. |
| 2008/0133541 A1 | 6/2008 | Fletcher et al. |
| 2008/0242420 A1 | 10/2008 | Graepel et al. |
| 2008/0306985 A1* | 12/2008 | Murray .................. G06Q 10/10 |
| 2009/0176476 A1 | 7/2009 | Foladare et al. |
| 2009/0248828 A1 | 10/2009 | Gould et al. |
| 2009/0299896 A1* | 12/2009 | Zhang .................... G06Q 40/00 705/38 |
| 2011/0047230 A1* | 2/2011 | McGee ............... H04L 41/0609 709/206 |
| 2011/0055158 A1 | 3/2011 | Tapper et al. |
| 2011/0173214 A1 | 7/2011 | Karim |
| 2011/0307296 A1 | 12/2011 | Hall et al. |
| 2012/0130987 A1 | 5/2012 | Bose et al. |

OTHER PUBLICATIONS

PCT ISR Jul. 1, 2014.

* cited by examiner

DATA DISTRIBUTION SYSTEM, METHOD AND PROGRAM PRODUCT

CROSS REFERENCE TO RELATED APPLICATION

The present invention is a continuation of U.S. patent application Ser. No. 13/773,593, "DATA DISTRIBUTION SYSTEM, METHOD AND PROGRAM PRODUCT" to Marcos Dias De Assuncao et al., filed Feb. 21, 2013; and, related to U.S. patent application Ser. No. 13/751,856, "DATA DISTRIBUTION SYSTEM, METHOD AND PROGRAM PRODUCT" to Marcos Dias De Assuncao et al., filed Jan. 28, 2013, both assigned to the assignee of the present invention and incorporated herein by reference.

BACKGROUND OF THE INVENTION

Field of the Invention

The present invention is related to sharing locally generated data among organizations in other locations and more particularly to more efficiently distribute data collected/generated for one location with other locations that may otherwise be unaware of, but that may have a need or use for, the data.

Background Description

A typical broad geographic area may cover many smaller locations, each managed and serviced by local authorities, e.g., organizations, government departments, and individuals. Local authorities are setting up operation centers, such as the IBM Intelligent Operations Center, to efficiently monitor and manage services for the location, e.g., police, fire departments, traffic management and weather. See, e.g., www-01.ibm.com/software/industry/intelligent-oper-center/.

A state of the art operation center includes an emergency capability that facilitates proactively addressing local emergencies. In particular, the operation center emergency capability facilitates departments in generating, collecting, and processing voluminous information about the local environment from a wide range of location services and simulation engines. Sources of this information include, for example, police departments, fire departments, traffic management systems, weather forecasts, and flooding simulation. The usefulness of much of this data produced, processed and collected by one entity may overlap with, be common with, and frequently is relevant to, not only other local organizations, but also to organizations in one or more of the other (e.g., surrounding) localities.

A typical operation center normally simulates and models local conditions and extreme weather conditions, e.g., traffic, weather and flooding in metropolitan areas. By combining local sensor data with the simulation results the operation center can identify possible infrastructure disruptions. After using the simulation results to identify potential disruptions, the operation center can identify similar conditions as they arise, and trigger appropriate local responses, e.g., initiate processes to circumvent and/or minimize effects of the disruptions. Thus, the simulation and model results have made an operation center an important tool in minimizing the impact of flooding and, moreover, for flood prevention planning in highly populated areas. Similarly, a typical operation center uses simulation and model data to facilitate situational planning for dry regions, e.g., to mitigate bush fire damage to crops.

A complete data picture is important to analyzing and predicting the potential impact of extreme or hazardous conditions for a specific locale. While, a typical simulation may focus on a small, limited area, the results generally depend on data from a more widespread region and surroundings. Simulating extreme weather conditions, for example, a hurricane impacting on a city, requires data from surrounding areas, and even distant locations. Locating and identifying all relevant data that may be available, has not been a simple task.

Thus, there is a need for discovering available geographically specific data and in particular for facilitating allowing owners of geographically specific data to share costs, and optimize producing and using geographically specific data.

SUMMARY OF THE INVENTION

A feature of the invention is more efficient sharing/distribution of data collected/generated by an organization with and among, other organizations that may be interested in the data;

Another feature of the invention is proactively distribution of collected/generated data in mutually agreeable format;

Yet another feature of the invention is more efficient distribution of collected/generated data, sharing the data with organizations in different locales, in a format suitable to other organizations.

The present invention relates to a data distribution system, method and a computer program product therefor. Computers provisioned with operations centers supporting individual locations share resources with organizations in multiple locations. Each operations center receives and evaluates local information for the supported location and selectively provides evaluated information for reuse by other locations. A data exchange agent in each operations center publishes information available from a supported location to a publication subscription unit. The operations center also subscribes to the publication subscription unit for information available from other locations. The publication subscription unit identifies matches between subscriptions and publications. A negotiation unit negotiates matched information transfers between operations centers.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
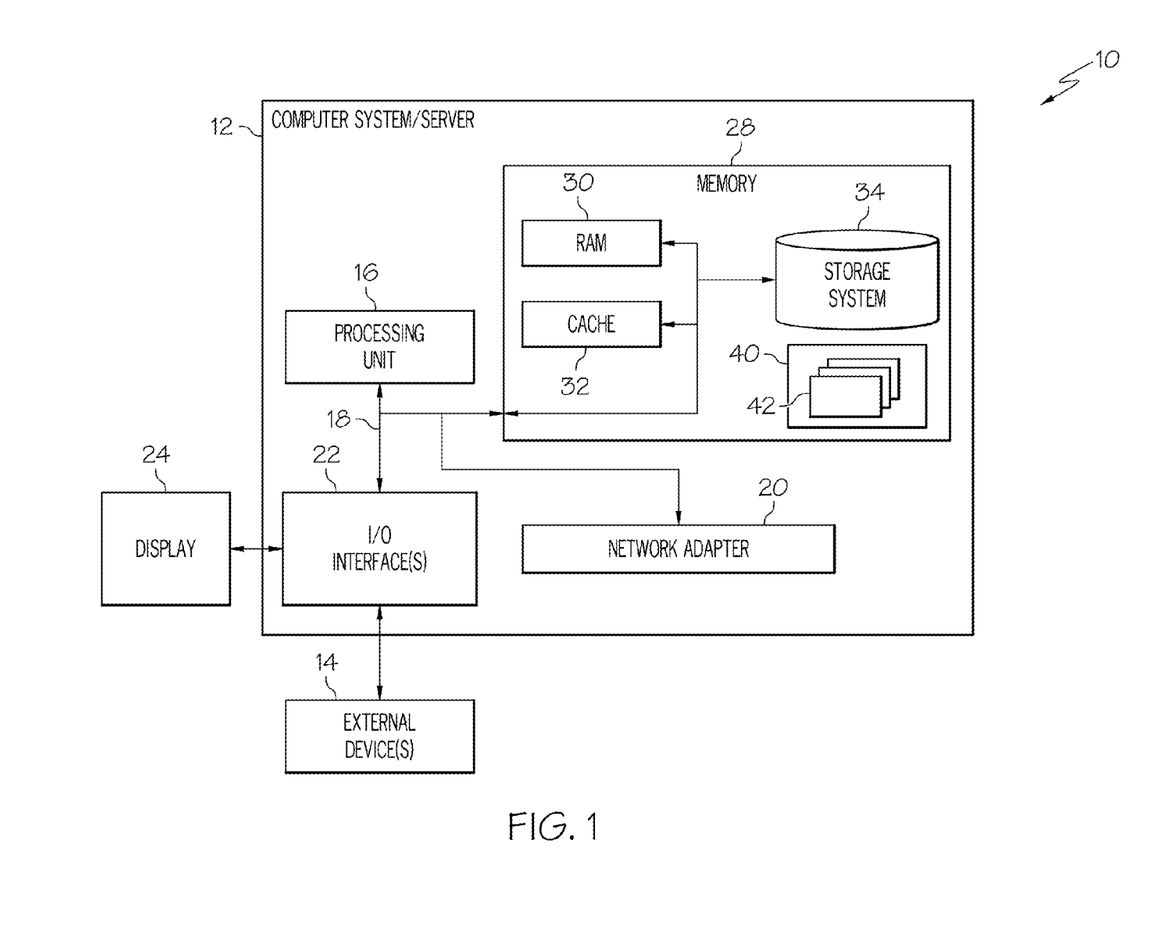
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a computer usable medium, such as non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
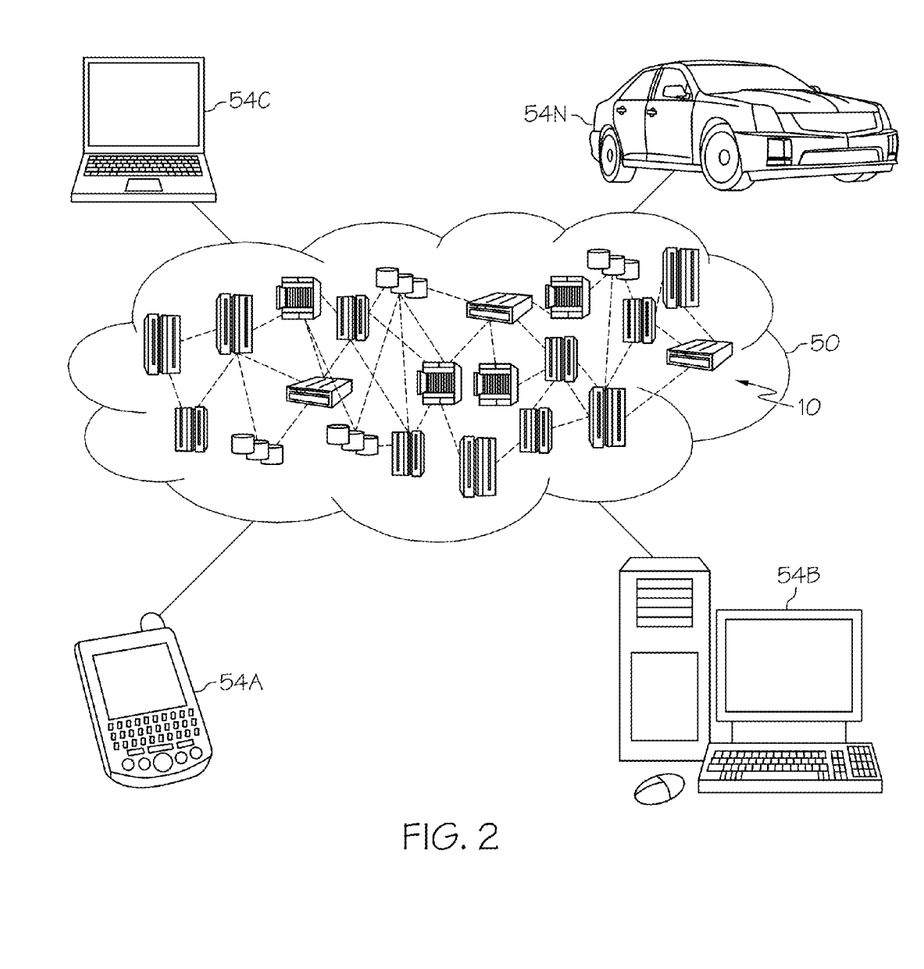
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
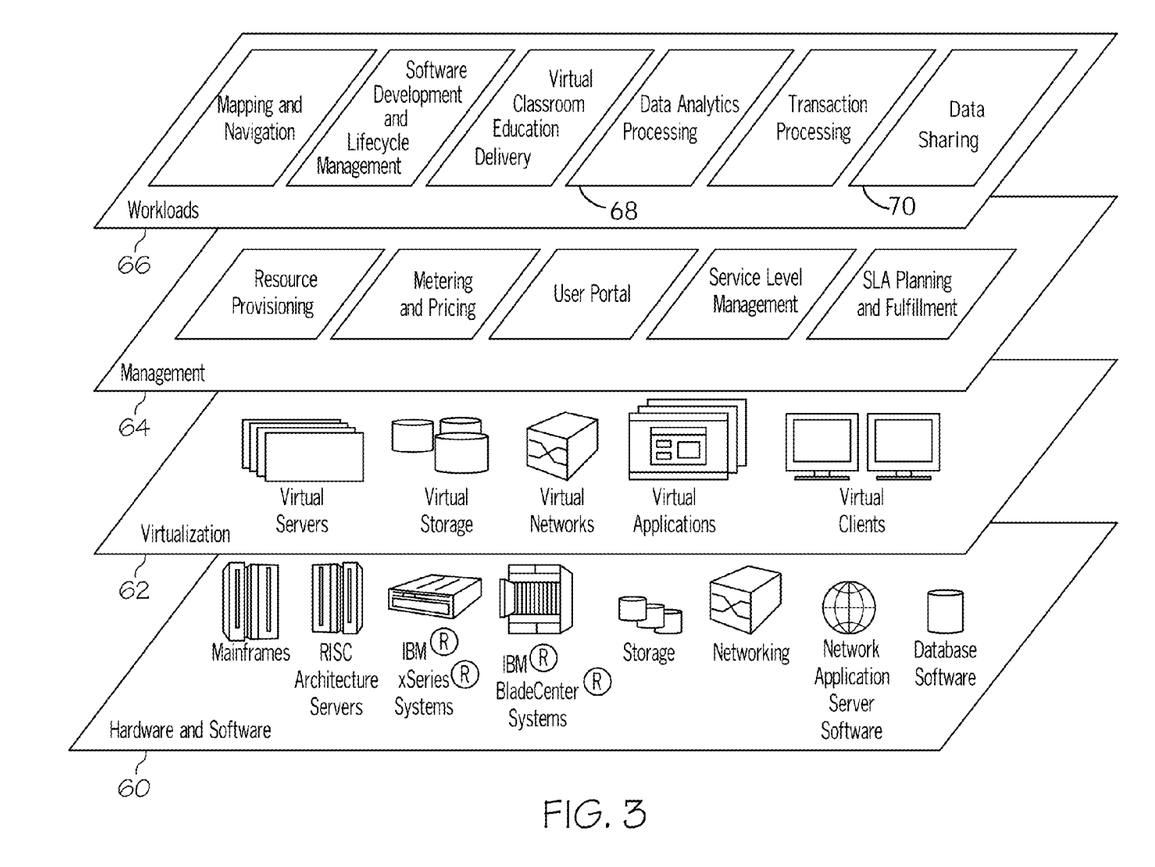
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing 68; transaction processing; and data sharing 70.

Figure 4A:
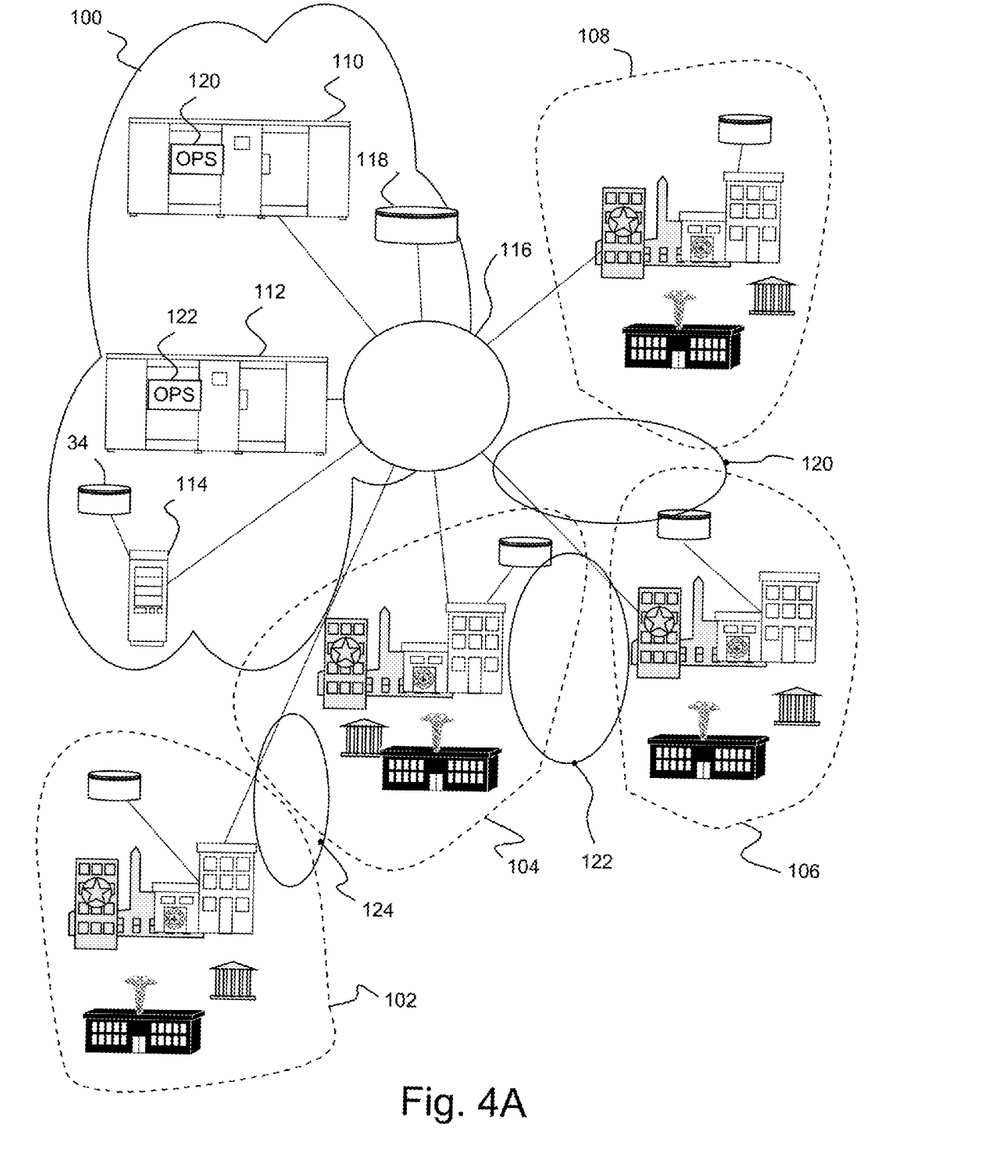
FIG. 4A shows an example of a preferred system distributing and sharing data between organizations servicing neighboring locales according to a preferred embodiment of the present invention.

FIG. 4A shows an example of a preferred system 100 distributing and sharing data between organizations servicing neighboring locales 102, 104, 106, 108, according to a preferred embodiment of the present invention. Organizations servicing neighboring locales 102, 104, 106, 108, clients of one or more system computers 110, 112, 114 connected to network 116, share geographically specific data, collected or generated and stored, e.g., in local storage 34 or in network attached storage (NAS) 118. Preferably, system computers 110, 112, 114 are cloud 100 computers, each provisioned with an operations center 120, 122 or centers supporting organizations in one or more locations 102, 104, 106, 108. Locale 102, 104, 106, 108 inhabitants, organizations (public and private) and individuals, produce data that is specific to a particular geographic region, i.e., the respective locale 102, 104, 106, 108.

Figure 4B:
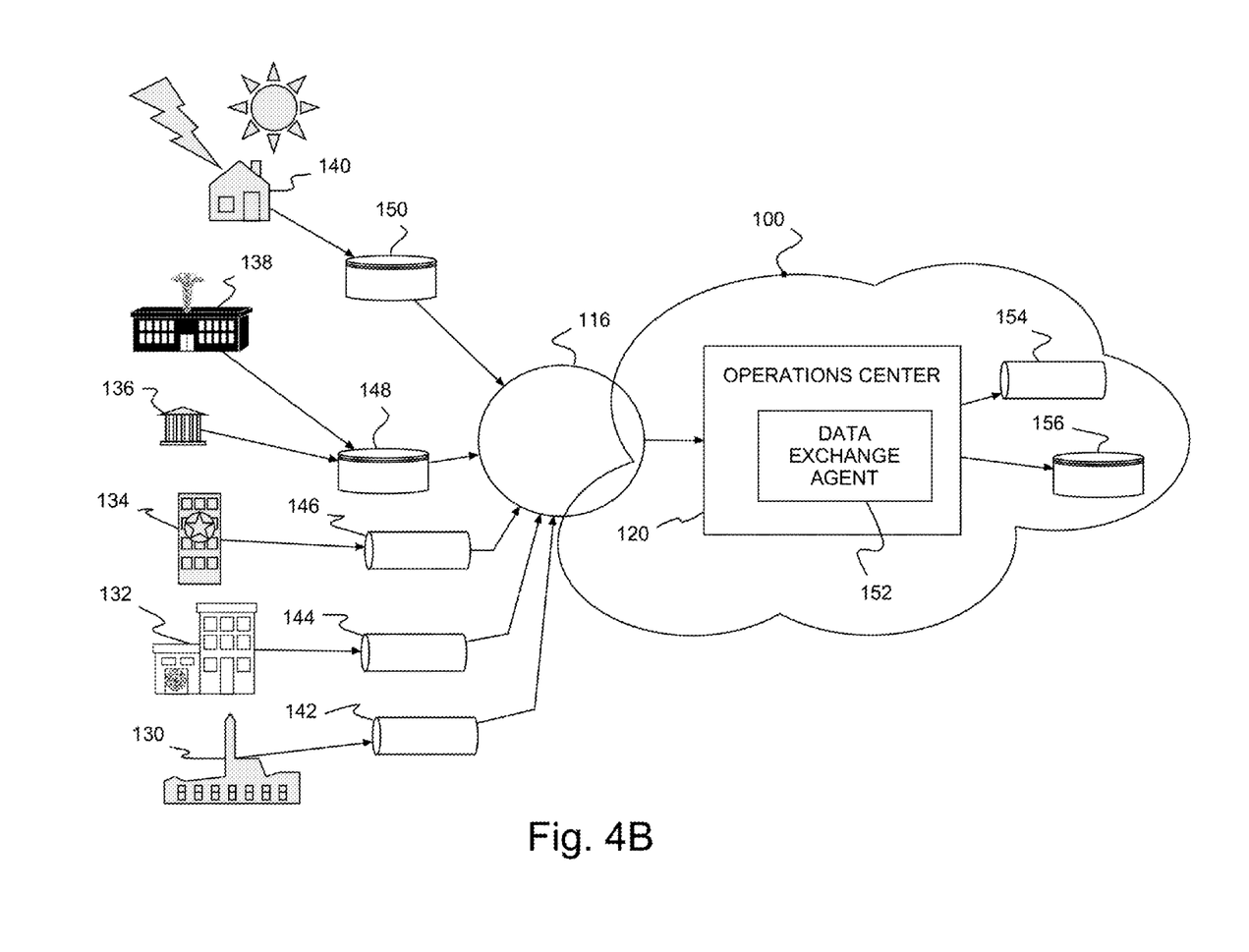
FIG. 4B shows a detailed example of a typical locale, e.g., a city, and city organizations.

FIG. 4B shows a detailed example of a typical locale 104, e.g., a city, and local organizations 130, 132, 134, 136, 138, 140 in the city 104. In this example the organizations include utilities 130, public safety 132, law enforcement 134, administration infrastructure 136, 138 and weather service 140. The utilities 130 may include, for example, water and power. Public safety 132 may include, for example, fire/emergency response. Law enforcement 134 may include police, for example. Administration infrastructure may include traffic condition monitoring 136 and medical/hospitals 138. Weather service 140 typically monitors flooding and other emergency and non-emergency weather events.

The utilities 130, public safety 132 and law enforcement 134 stream data 142, 144, 146 over the network 116 to the operations center 120. The streamed data 142, 144, 146 can originate, for example, from sensors and systems monitoring local infrastructure and services. Similarly, the administration infrastructure 136, 138 and weather service 140 each maintain local data 148, 150 that is accessible over the network 116 by the operations center 120. Thus, the weather service 140 may collect and locally maintain data 148, 150 from weather forecast and environmental simulations. The operations center 120 includes a data exchange agent 152 consuming collected data 142, 144, 146, 148, 150, selectively distributing data 154, 156 and selectively receiving data from other locations.

Thus, the data exchange agent 152 may run simulations on data collected for consumption locally, monitor location conditions and select data for external distribution, e.g., on an available data stream 154 or otherwise make collected data available 156 to organizations for services in other locations. Examples of services that may consume available data include, for example, forecast precipitation data for flood simulations in a given geographical area, e.g., 122, 124. Simultaneously, the data exchange agent 152 may collect available data from other locations made available by other data exchange agents 152 for other locations.

A preferred system 100 selects data 142, 144, 146, 148, 150 collected for the local organizations 130, 132, 134, 136, 138, 140 in one locale, e.g., 104, to make available 154, 156 for reuse by other organizations in other locales 102, 106, 108, and conditions for such reuse. For example, re-use/distribution conditions can include what resolution to offer, parameter ranges, and measurement sampling frequency. Also other organizations may use a preferred system 100 to specify interest requirements to match in available data and data streams. Once a match is found, organizations can renegotiate data transactions using filtering and aggregation techniques based on data sampling. In particular, local organizations 130, 132, 134, 136, 138, 140 can explore data samples to determine whether the data quality is likely to be satisfactory and/or whether to adjust data requirements. Thus, advantageously, the present invention reduces data production costs, and provides data collecting/generating organizations 130, 132, 134, 136, 138, 140 with business opportunities for marketing the data.

Figure 5:
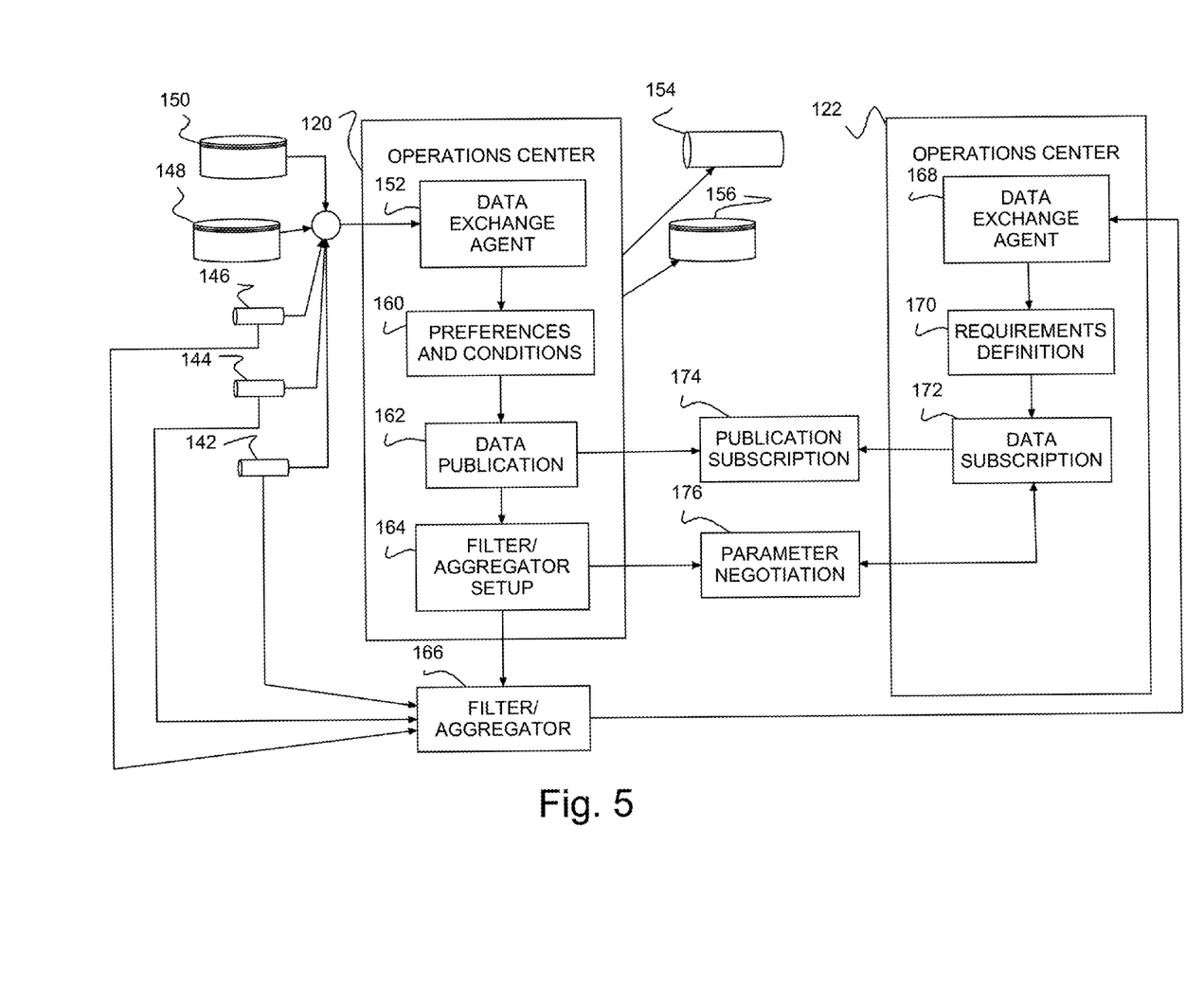
FIG. 5 shows an example of multiple preferred operation centers in shared information technology (IT) infrastructure (e.g., in cloud computing infrastructure) facilitating data consumption and production.

FIG. 5 shows an example of multiple preferred operation centers 120, 122 in shared information technology (IT) infrastructure (e.g., in cloud computing infrastructure) facilitating data production and consumption according to a preferred embodiment of the present invention with reference to FIGS. 4A-B, identical features being labeled identically. In this example, local organizations in one locale, e.g., 104, generate the data from services or simulations and local organizations in another locale, e.g., 106, which may be a potential data consumer. So, the preferred operation center 120 makes generated data available to potential data consumer organizations through another preferred operation center, e.g., 122, such that potential data consumption organization can select generated data that meet local reuse needs.

Thus in this example, the generating operation center 120 also includes a preferences and conditions unit 160, a data publication unit 162 and a filter/aggregations setup or generation unit 164, which generates and deploys filter/aggregators 166 for handling incoming data streams 142, 144, 146. Similarly, in addition to a data exchange agent 168, the consumption operation center 122 includes a requirements definition unit 170 and a data subscription unit 172. A publication subscription unit 174 matches published data with subscribed interests of potential consumers. A parameter negotiation unit 176 negotiates and renegotiates data transactions between the generating operation center 120 and the consumption operation center 122. The setup or generation unit 164, deployed filter/aggregator 166 and parameter negotiation unit 176 cooperate as a data exchange adjustment component set.

Preferably, the publication subscription unit 174 is a content-based publish/subscribe service, e.g., data analytics processing 68 in FIG. 3, allowing the operation centers 122 to subscribe to streams 154 and data 156 provided (or published) by other organizations 120. The operation centers 120, 122 define publications and subscriptions according to metadata properties that contain the characteristics of available data and/or a certain desired stream or data. Thus, the data publication unit 162 defines the preferences as a set of n attribute-value pairs. Likewise, the data subscription unit 172 defines subscription characteristics as a set of n attribute-value pairs. Preferably, each attribute $a\_i$ includes a name and a value $v\_i$ with a comparison operator (e.g., $\leq$, $<$, ≥, >, _=, =). The attribute values may be, for example, numerical, or an alphanumeric character string. Further, the data subscription unit 172 may specify allowed values as single values or as ranges of values. Attributes defining characteristics may include, for example, offered resolution, parameter ranges and measurement sampling frequency. Accordingly, published data or a published stream with a certain set of characteristics matches a subscription, if and only if published attributes satisfy all subscription requirement attributes.

It should be noted that although shown herein as organizations in locale 104 generating data for consumption in locale 106, this is for example only. Typically, additional location organizations may be generating data and, as the need/opportunity arises, consuming data from each other. So, while consuming data from organizations in location 104, organizations in location 106 may be generating data for consumption by organizations in locations 102, 104 and 108 with preferred operation centers 120, 122 managing distribution as described for transactions just between organizations in location 104 and location 106.

Figure 6A:
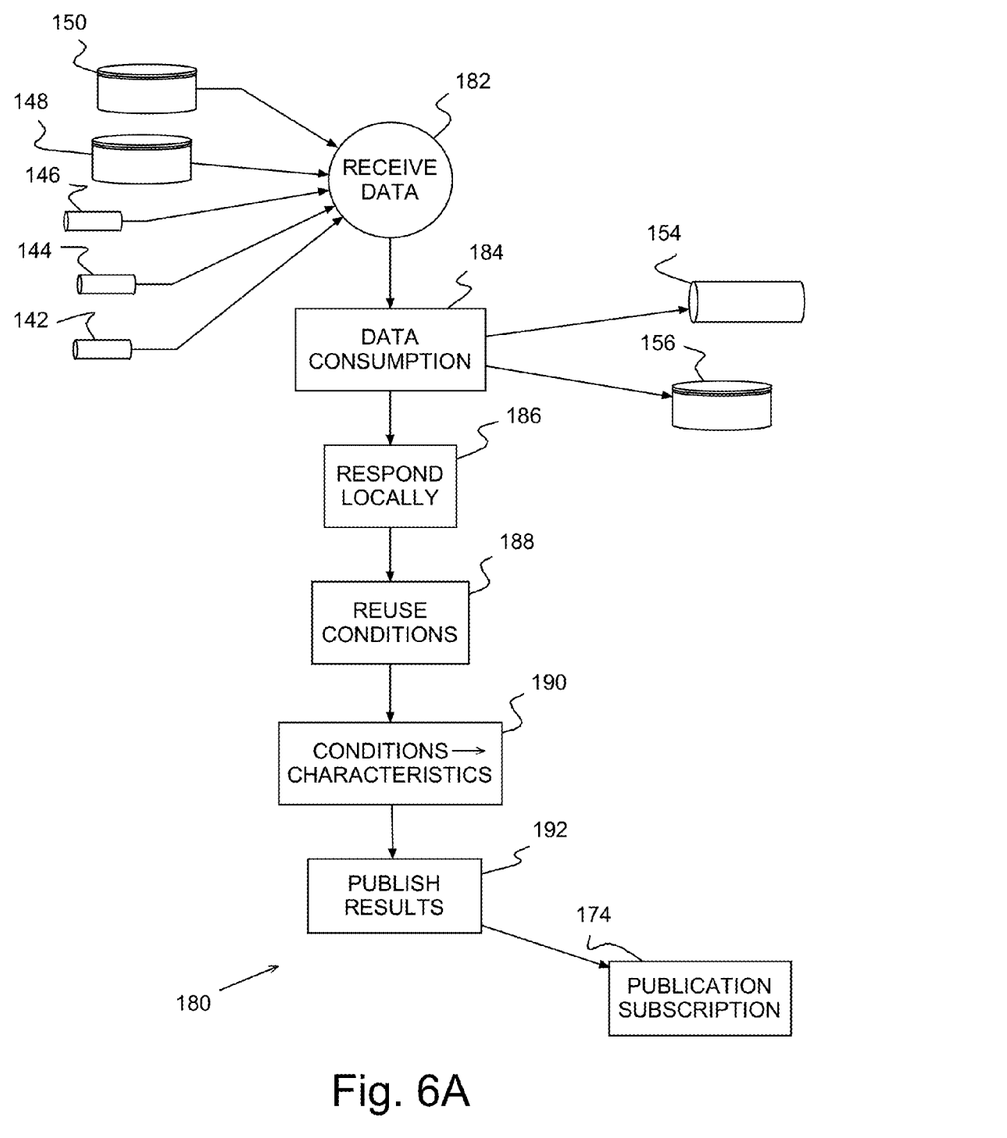
FIGS. 6A-B show an example of collecting and publishing data 180, and subscribing and receiving published data.
Figure 6B:
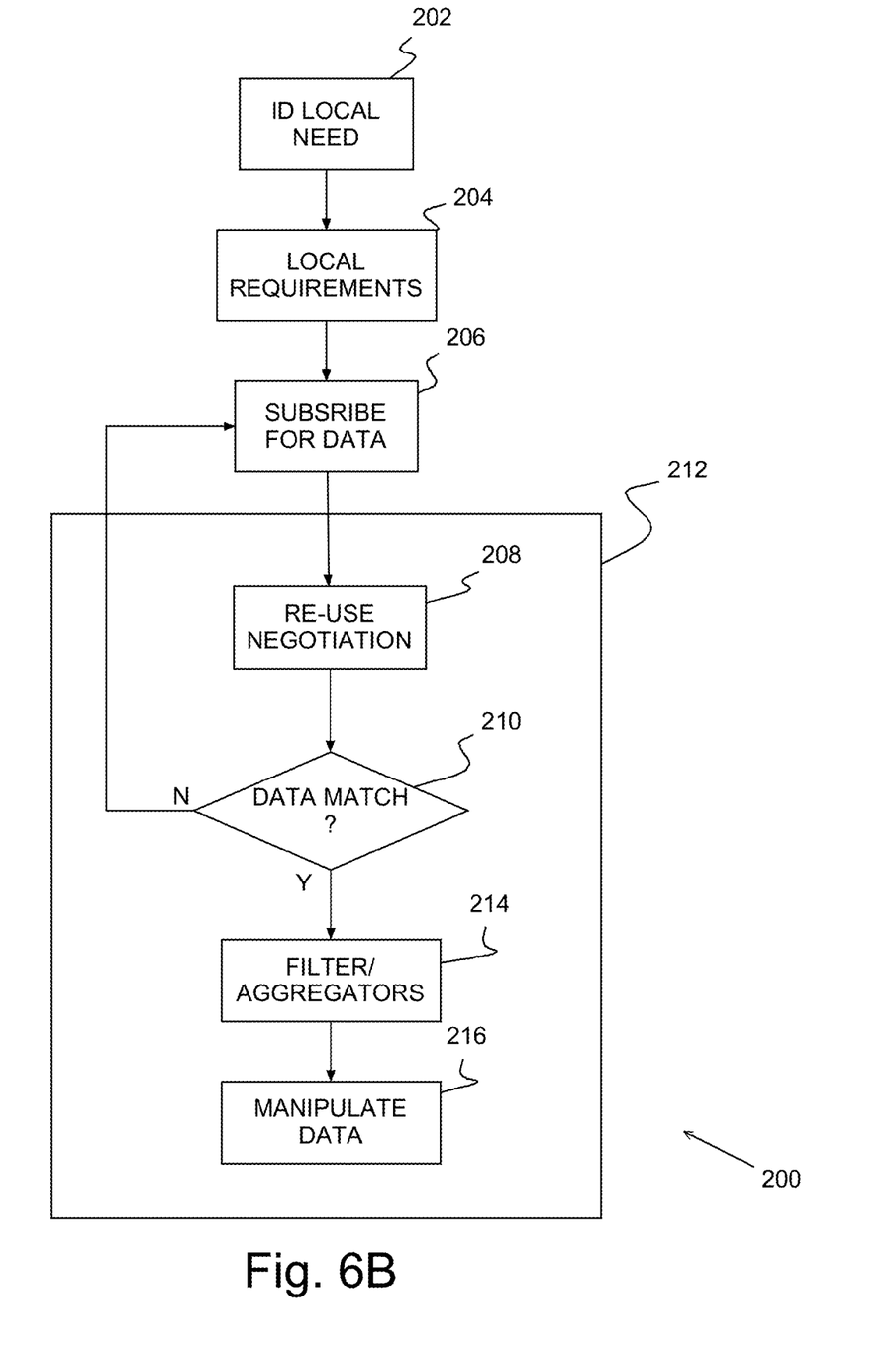

FIG. 6A shows an example of collecting and publishing data 180, and FIG. 6B shows an example of subscribing and receiving published data 200. First, the data exchange agent, 152 in the example of FIG. 5, receives/collects data 182 from sources 142, 144, 146, 148, 150 and uses 184 the data for simulations or analysis to generate data streams 154 or files 156 for use. The data collecting/generating organizations 130, 132, 134, 136, 138, 140, take appropriate action 186 to handle local incidents, e.g., in infrastructure and services. The preferences and conditions unit 160 specifies conditions 188 for making input and output streams 142, 144, 146, 154 and collected data 148, 150, 156 available to other organizations for reuse. The data publication unit 162 translates 190 the specified conditions into characteristics and parameter ranges, and the publication subscription unit 174 publishes 192 the results.

So in one example, the operation center 120 may have precipitation forecast (attribute or characteristics type) data 150 with a minimum resolution of 1 $Km^2$ for the locale 104. The operation center 120 may decide to make this data available, publishing 192 to other locations 102, 106, 108 at the same or a lower resolution, e.g., within 1 $Km^2$ and 15 $Km^2$. In another example, the operation center 120 may have traffic simulation results (characteristics type="traffic") within a 100 $Km^2$ geographical area. The operation center 120 may publish 192 the results about certain geographical areas in that larger area 100 $Km^2$ or with a 1 $Km^2$<resolution<50 $Km^2$ and for a 50 $Km^2$<geographical area<150 $Km^2$ for that locale 104.

Subsequently, the data exchange agent 152 for another operation center 122 identifies 202 a local need for data in FIG. 6B. The requirements definition unit 170 defines local data requirements 204 and the data subscription unit 172 subscribes 206 with publication subscription unit 174 for certain preferences of streams or for acquiring streamed data that satisfy defined local data requirements. The operation centers 120, 122 share a data sample and negotiate 208 data characteristics for reuse. When the publication subscription unit 174 matches 210 offer conditions 192 with search preferences 204 for the search. The setup unit 164 sets up the filter(s) and/or aggregator(s) 214 required to manipulate or re-format the data for the requesting operation center 122. The deployed filter/aggregator 166 modifies and/or manipulates the data 216 to meet the negotiated data characteristics. If the provided data fails to satisfy the needs for the subscribing operation center 122, the centers 120, 122 may enter data adjustment 212. Data adjustment 212 begins a re-negotiation 212, where the organization centers 120, 122 re-negotiate different data characteristics for reuse based on updated requirements.

So in the above traffic example, operation center 122 subscribes with data type="traffic," 5 $Km^2$<resolution<10 $Km^2$, geographical area=100 $Km^2$ and location=locale 106. The published 192 characteristics from operation center 120 fall in the subscription ranges and match 210. For n operation centers, a preferred publication subscription unit 174 of FIG. 5 selects one organization with the maximum requirements $(r_1, r_2, r_3, \ldots, r_n)$ matching, sharing or in common with, published data characteristics $(c_1, c_2, c_3, \ldots, c_n)$ as a match. Preferably, the requested characteristics fall in the range of the provided characteristics. So for example, even if the publishing operation center 120 publishes data with an original resolution range of 5 $Km^2$ to 15 $Km^2$, the offered/published resolution may be 1 $km^2$ during negotiation 208 if the subscribing operation center 122 may requests a 1 $km^2$ resolution. After negotiation 208 the publishing operation center 120 dynamically generates 214 and applies filters and aggregators 216 during delivery of the data files 142, 144, 146 and streams 148, 150.

Figure 7:
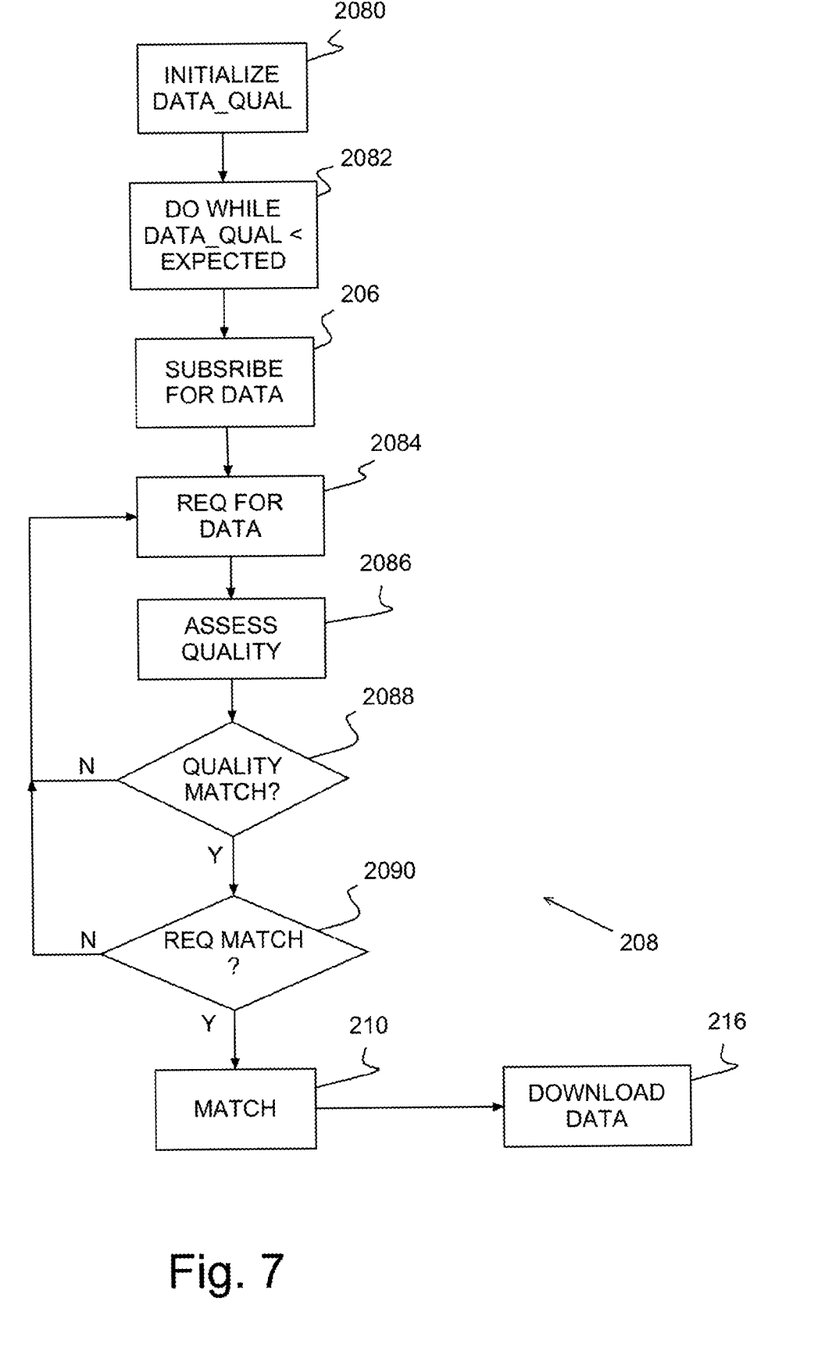
FIG. 7 shows an example of negotiations with the originating operation center providing potential customer operation centers with data samples for quality testing.

FIG. 7 shows an example of negotiations 208 with potential customers (other subscribing operation centers, e.g., 122), wherein the originating operation center, 102 in this example, provides potential customers with data samples for quality testing. The subscribing operation center 122 first initializes 2080 a data quality variable, e.g., set the variable to 0. Then, the subscribing operation center(s) 122 begins iteratively examining the data 2082 until quality exceeds a previously defined, expected quality, or if the data parameters remain within an offered range.

So first, the subscribing operation center(s) 122 sends a request 2084 for a data sample and assesses sample quality 2086. If the quality does not exceed, or match expected quality, the data does not match and the subscribing operation center(s) 122 continues sending requests 2084. Once the quality exceeds or matches 2088 expected quality, the subscribing operation center 122 checks whether the sample indicates that data requirements need to be adjusted 2090, e.g., for higher/lower resolution. If the sample indicates that the data fails to meet requirements, the sample does not match and the subscribing operation center 122 sends a request 2084 to begin the next iteration. Otherwise, the data matches 210 and the subscribing operation center 122 downloads the data 2100.

Thereafter, the subscribing operation center 122 may decide to refine characteristics during data adjustment 212, which begins after the publication subscription unit 174 finds a match 210. Preferably during data adjustment 212, filtering and aggregation 216 selects data that maximize intersecting published/subscribed parameter ranges for each data attribute. While using downloaded data, the subscribing operation center 122 may discover that the previously negotiated characteristics/requirements do not produce desired results, e.g., by checking the simulation results. If the data produces inadequate results, the operations center 120, 122 may renegotiate 210 the characteristics, and the publishing operations center 120 dynamically adjusts filters and aggregators to the new agreement. So in the above example, the characteristics may be re-negotiated 210 for a new resolution, e.g., 2 $km^2$ and the filter/aggregator adjusted to the new 2 $km^2$ resolution. Of course, an organization may cancel at any point during negotiation or re-negotiation.

Aggregators and filters each may be in software and may be used both to transfer samples and for downloading. A typical aggregator operates on data from two or more sources (e.g., 142, 144, 146, 148, 150 in FIG. 4B) to produce one or more outputs 154, 156. Typical examples of aggregator operations include, but are not limited to, averaging values, calculating the standard deviation and otherwise performing data analysis on multiple values. A typical filter acts on data from sources (e.g., 142, 144, 146, 148, 150) to selectively remove portions according to previously specified filtering criteria, e.g., reducing resolution or other attributes, sampling and/or anonymizing the data.

An economics mechanism may be used to compensate publishing operation centers for the data. For an example of a suitable economics mechanism see, U.S. patent application Ser. No. 13/751,856, "DATA DISTRIBUTION SYSTEM, METHOD AND PROGRAM PRODUCT" to Marcos Dias De Assuncao et al., filed Jan. 28, 2013, assigned to the assignee of the present invention and incorporated herein by reference.

Thus advantageously, the present invention allows organizations to selectively make collected data available for reuse by other organizations, local or remote, and further, to specify preferences for such reuse, e.g., at an offered resolution, with selected parameter ranges and at a particular sampling frequency. The present invention also allows other, potential consuming organizations to specify interest in available data and data streams to find requirement matches. Further, the present invention facilitates adjusting to meet changing requirements through data negotiation and renegotiation using filtering and aggregation based on data sampling.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A data distribution method comprising:
   subscribing for data relevant to a location with a publication subscription unit publishing data to a plurality of subscribing locations, an operations center in each location subscribing for data with attributes matching identified local requirements, said publication subscription unit publishing data with matching attributes to each respective location whenever published attributes satisfy all subscription requirement attributes;
   collecting data relevant to a location, collected said data being environmental data about said location and published environmental data characteristics from other operations centers, wherein said environmental data includes weather data, emergency event and emergency response data;
   analyzing said collected data and said published environmental data characteristics for local needs;
   responding locally responsive to data analysis;
   identifying data conditions for making collected data results available to other said local organizations; and
   publishing environmental data characteristics of available said collected data with said publication subscription unit responsive to identified said data conditions for said other locations.

2. A data distribution method as in claim 1, analyzing said collected data comprising said publication subscription unit:
   identifying any subscription matching said published environmental data;
   generating a filter/aggregator responsive to said identified data conditions;
   applying said filter/aggregator to conform said data results to said identified data conditions; and
   downloading conforming said data results to said location supported by the subscribing operations center.

3. A data distribution method as in claim 1, wherein analyzing said published environmental data characteristics comprises:
   requesting a data sample;
   assessing data quality based on said sample;
   checking whether sample quality matches an indicated expected quality; and whenever quality matches
   determining whether said published environmental data characteristics match said data requirements, data being downloaded for a matching sample.

4. A data distribution method as in claim 3, wherein another sample is requested and assessed whenever sample quality or published environmental data characteristics do not match.

5. A data distribution method as in claim 4, wherein said published environmental data characteristics are defined by attributes, said attributes including an offered resolution, parameter ranges and a measurement sampling frequency.

6. A computer program product for location data sharing and distribution, said computer program product comprising a no-transitory computer usable medium having computer readable program code stored thereon, said computer readable program code causing a plurality of computers executing said code to:
   subscribe for data relevant to a location with a publication subscription unit publishing data to a plurality of subscribing locations, an operations center in each location subscribing for data with attributes matching identified local requirements, said publication subscription unit publishing data with matching attributes to each respective location whenever published attributes satisfy all subscription requirement attributes;
   collect data relevant to a location, collected said data being environmental data about said location and published environmental data characteristics from other operations centers, wherein said environmental data includes weather data, emergency event and emergency response data;
   analyze said collected data and said published environmental data characteristics for local needs;
   respond locally responsive to data analysis;
   identify data conditions for making data results available to other said local organizations; and
   publish environmental data characteristics of available said collected data with said publication subscription unit responsive to identified said data conditions for said other locations.

7. A computer program product for location data sharing and distribution as in claim 6, said computer readable program code analyzing said collected data causing publication subscription units in said plurality of computers executing said code to:
   identify any subscription matching said published environmental data;
   generate a filter/aggregator responsive to said identified data conditions;
   apply said filter/aggregator to conform said data results to said identified data conditions; and
   download conforming said data results to said location supported by the subscribing operations center.

8. A computer program product for location data sharing and distribution as in claim 6, wherein analyzing said published environmental data characteristics checks for a match with said data requirements, analyzing causing said plurality of computers executing said code to:
- request a data sample;
- assess data quality based on said sample;
- check whether sample quality matches an indicated expected quality; and whenever quality matches
- determine whether said published environmental data characteristics match said data requirements, data being downloaded for a matching sample.

9. A computer program product for location data sharing and distribution as in claim 8, wherein said plurality of computers are a plurality of cloud computers with provisioned operations centers managing data publication and subscription, each operation center requesting and assessing another sample whenever sample quality or published environmental data characteristics do not match, and said published environmental data characteristics are defined by attributes, said attributes including an offered resolution, parameter ranges and a measurement sampling frequency.

* * * * *